(12) United States Patent
Igusa

(10) Patent No.: US 11,794,234 B2
(45) Date of Patent: Oct. 24, 2023

(54) PROCESSING APPARATUS, PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Masahiro Igusa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 782 days.

(21) Appl. No.: 16/515,007

(22) Filed: Jul. 17, 2019

(65) Prior Publication Data

US 2020/0265257 A1 Aug. 20, 2020

(30) Foreign Application Priority Data

Feb. 20, 2019 (JP) ................. 2019-028256

(51) Int. Cl.
| | | |
|---|---|---|
| B21D 43/05 | (2006.01) |
| G06T 7/00 | (2017.01) |
| G06T 7/30 | (2017.01) |
| G06V 10/24 | (2022.01) |
| G06V 10/147 | (2022.01) |
| G06V 20/52 | (2022.01) |
| H04N 23/90 | (2023.01) |

(52) U.S. Cl.
CPC ............. *B21D 43/05* (2013.01); *G06T 7/001* (2013.01); *G06T 7/30* (2017.01); *G06V 10/147* (2022.01); *G06V 10/24* (2022.01); *G06V 20/52* (2022.01); *G06T 2207/30164* (2013.01); *H04N 23/90* (2023.01)

(58) Field of Classification Search
CPC .......... G06T 2207/30164; H04N 5/247; H04N 5/2253; H04N 5/232; B21D 35/00; B21D 43/05; B21D 43/18; B30B 15/26; G06V 20/52; G06F 16/51; G06F 16/5866
See application file for complete search history.

(56) References Cited

U.S. PATENT DOCUMENTS 5,907,900 A 6/1999 Okazaki et al.
2008/0083114 A1* 4/2008 Kim .................. H05K 13/0812
348/87

(Continued)

FOREIGN PATENT DOCUMENTS

| CN | 103597394 A | * 2/2014 | ........... G02B 27/646 |
| JP | H04372389 | 12/1992 | |

(Continued)

OTHER PUBLICATIONS

"Office Action of Japan Counterpart Application", dated Jan. 17, 2023, with English translation thereof, pp. 1-9.

(Continued)

*Primary Examiner* — Samira Monshi
(74) *Attorney, Agent, or Firm* — JCIPRNET

(57) ABSTRACT

A processing apparatus includes a holding section that holds a processing target, an imaging section that is positionally fixed with respect to the holding section, and images a surface of the processing target, and a control section that controls the imaging section to image the surface of the processing target in a state in which the holding section holds the processing target.

18 Claims, 9 Drawing Sheets

(56) References Cited

U.S. PATENT DOCUMENTS

2010/0269555 A1 10/2010 Theis et al.
2015/0030125 A1* 1/2015 Pfander ................. G01N 23/04
378/57

FOREIGN PATENT DOCUMENTS

| JP | H09214193 | 8/1997 |
| JP | H1051595 | 2/1998 |
| JP | 2005238284 | 9/2005 |
| JP | 2005238284 A * | 9/2005 |
| JP | 2017026441 | 2/2017 |

OTHER PUBLICATIONS

"Notice of Reasons for Refusal of Japan Counterpart Application", dated Jul. 4, 2023, with English translation thereof, p. 1-p. 8.

* cited by examiner

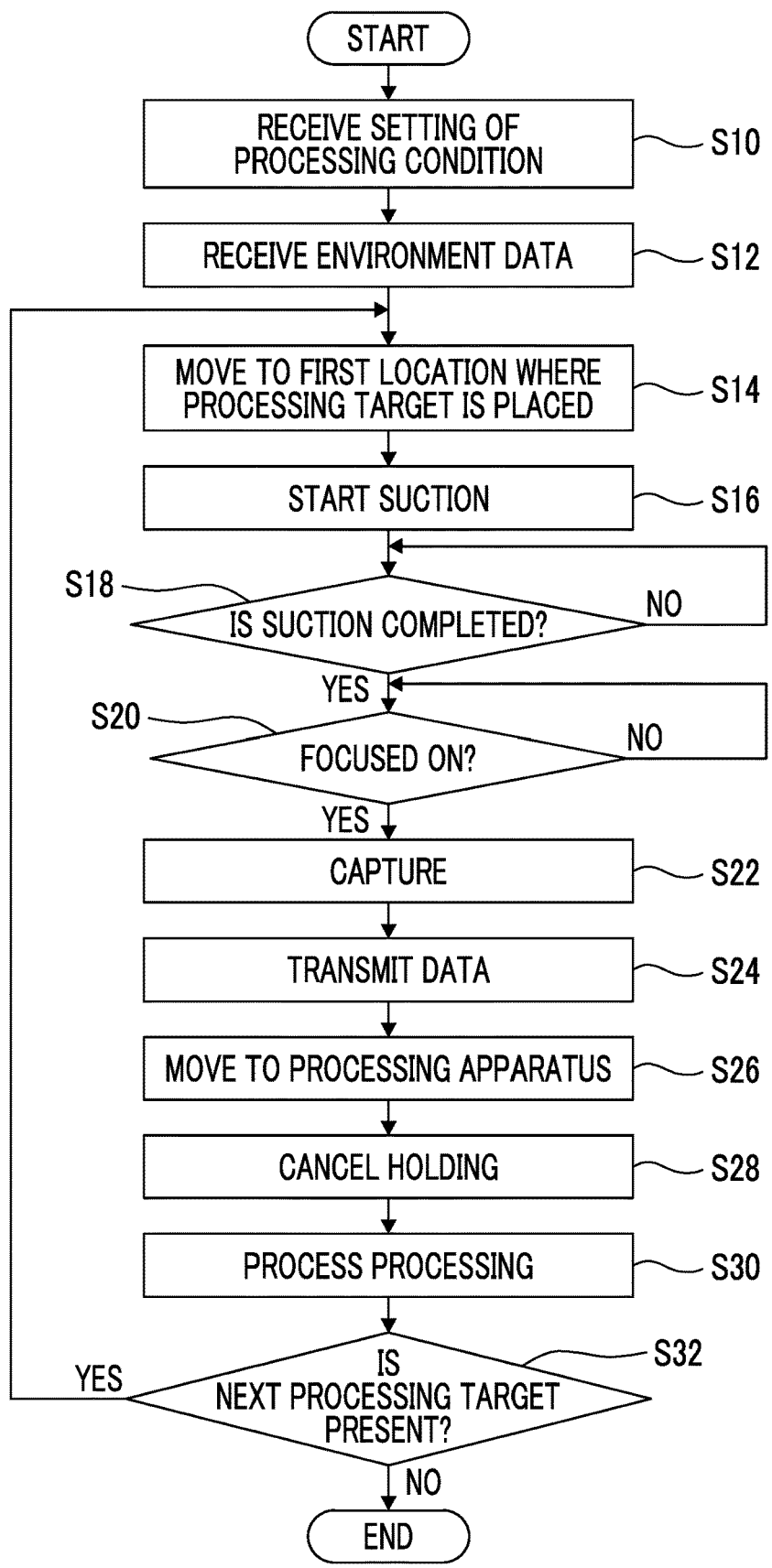

FIG. 7

| CAPTURED IMAGE MANAGEMENT NUMBER | | | 789456 | 456123 |
|---|---|---|---|---|
| IMAGING DATE | | | 10/25/2018 10:25 | 10/25/2018 14:12 |
| LOT NUMBER OF MATERIAL (MATERIAL MANAGEMENT NUMBER) | | | 1-a | 1-b |
| PROCESSING TARGET NUMBER | | | Ta964311 | Tb458966 |
| ENVIRONMENT DURING IMAGING | TEMPERATURE | | 21°C | 23.5°C |
| | HUMIDITY | | 78% | 82% |
| PROCESSING CONDITION | PROCESS | | A | B |
| | POSITION | | a-12 | b-23 |
| | PRESS PRESSURE | | 14.7kN | 21.6kN |
| | TACT TIME | | 3.2s | 4.3s |
| | SETTING OF PROCESSING APPARATUS | | F1 | F3 |
| LOT NUMBER OF FINISHED PRODUCT (FINISHED PRODUCT MANAGEMENT NUMBER) | | | Ymm784581a | - |

PROCESSING APPARATUS, PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-028256 filed Feb. 20, 2019.

BACKGROUND

Technical Field

The present invention relates to a processing apparatus, a processing system, and a non-transitory computer readable medium storing a program.

Related Art

JP1997-214193A discloses a component mounting device which has a plurality of component stages and mounts a component held by each of the component stages on a board supported by aboard support stage, the component mounting device including amounting head that includes a holding member movably provided between the component stage and the board support stage and holding the component, and a positioning chuck that positions the held component to a predetermined position; an imaging unit that includes an imaging camera disposed to face the mounting head within a movement range of the mounting head and capturing an image of the component held by the holding member; and a light blocking cover that is disposed to face the mounting head with the movement range of the mounting head, and is gripped by the positioning chuck so as to be detachably attached to the mounting head, in which positioning of the component held by the holding member for the board is performed based on selection of positioning performed by the positioning chuck or positioning performed through processing on image data received by the imaging camera.

JP1998-051595A discloses an image processing system including a subject; a photoelectric converter that images the subject; a light blocking section that covers the subject, and has a light input portion of the photoelectric converter thereinto; a lighting portion that is provided in the light blocking section and illuminates the subject with ambient light as leakage light; and an image processing device that processes a captured image of the subject by receiving an image output from the photoelectric converter.

JP2005-238284A discloses a workpiece positioning apparatus including a camera that captures an image of a workpiece placed on a processing table; an illumination portion that illuminates a portion imaged by the camera from the vicinity of the workpiece; a light blocking plate that is disposed to shield a gap between the camera and the illumination portion from external light; and a drive device that moves up and down the light blocking plate and the illumination portion.

SUMMARY

Aspects of non-limiting embodiments of the present disclosure relate to a processing apparatus, a processing system, and a non-transitory computer readable medium storing a program capable of specifying an imaging position with high accuracy compared with a case where holding of a processing target and imaging of a processing target are performed separately from each other, in a case where a surface image of the processing target is captured.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a processing apparatus including a holding section that holds a processing target; an imaging section that is positionally fixed with respect to the holding section, and images a surface of the processing target; and a control section that controls the imaging section to image the surface of the processing target in a state in which the holding section holds the processing target. Here, the term "positionally fixed" indicates that a relative position of the imaging section with respect to the holding section is fixed, and includes not only a case where the holding section and the imaging section are fixed to a single member but also a case where relative positions are defined even though the holding section and the imaging section are fixed to different members.

BRIEF DESCRIPTION OF THE DRAWINGS

Exemplary embodiment(s) of the present invention will be described in detail based on the following figures, wherein:

FIG. 6 is a flowchart illustrating a control flow in the control device used for the processing apparatus according to the exemplary embodiment of the present invention;

FIG. 7 is a chart illustrating data registered in a database in the processing system according to the exemplary embodiment of the present invention;

DETAILED DESCRIPTION

Figure 1:
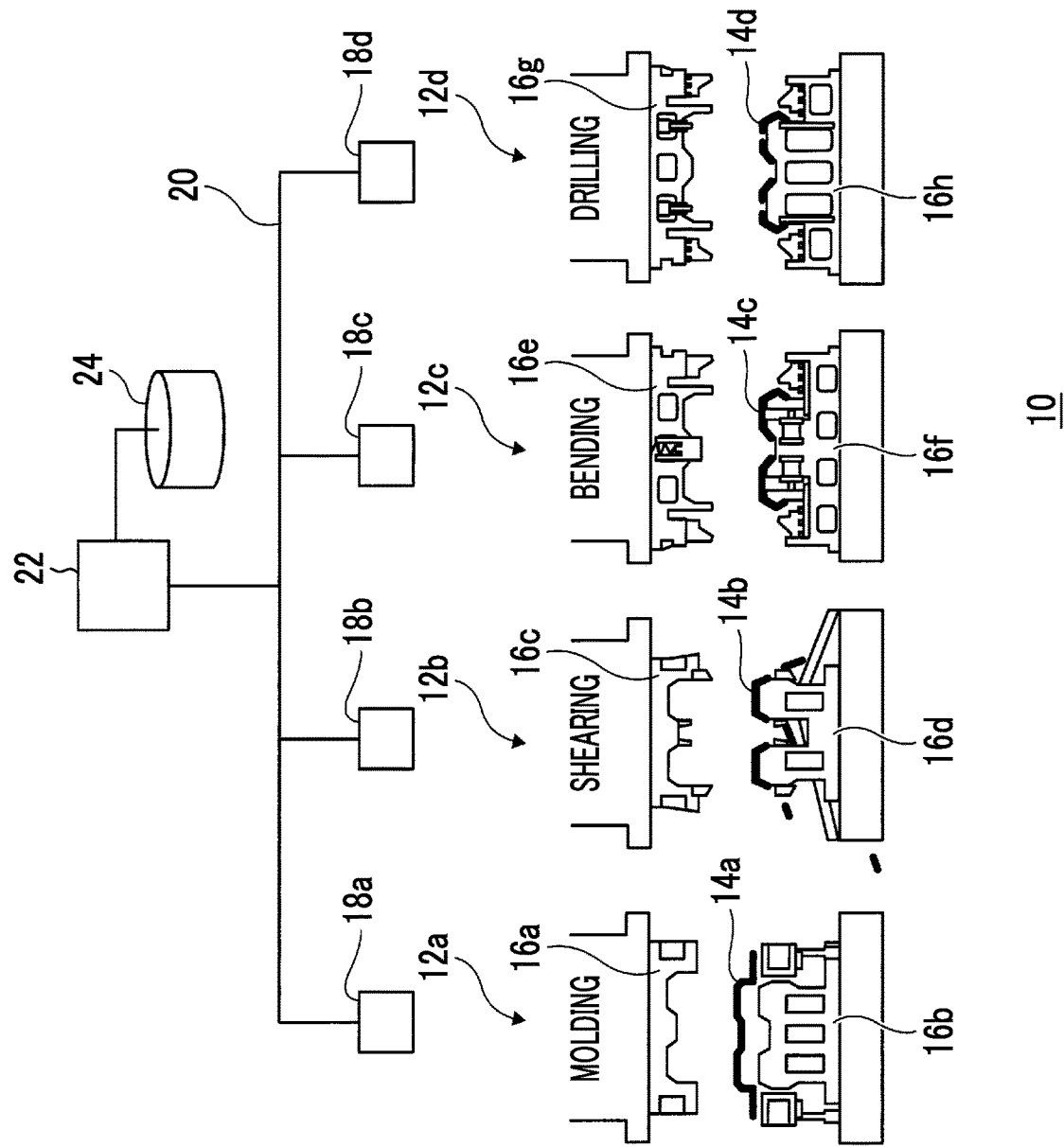
FIG. 1 is a schematic diagram illustrating a processing system according to an exemplary embodiment of the present invention.

Next, an exemplary embodiment of the present invention will be described in detail. FIG. 1 illustrates a processing system 10 according to an exemplary embodiment of the present invention.

The processing system 10 is a pressing system for a vehicle such as an automobile. The pressing includes processes such as molding, shearing, bending, and drilling. The molding is performed by interposing a processing target 14a which is a metal plate between upper and lower molds 16a and 16b, and applying pressure to the processing target 14a which is thus plastically deformed, by using a molding apparatus 12a. The shearing is performed by interposing a molded processing target 14b between upper and lower molds 16c and 16d, and cutting out a necessary portion, by using a shearing apparatus 12b. The bending is performed by interposing a sheared processing target 14c between upper and lower molds 16e and 16f, and applying pressure to the processing target 14c of which a necessary portion is thus bent, by using a bending apparatus 12c. The drilling is performed by interposing a bent processing target 14d between upper and lower molds 16g and 16h, and drilling a necessary portion, by using a drilling apparatus 12d. The pressing may include drawing or compression in addition to the molding, the shearing, and the drilling.

The processing apparatuses 12a to 12d are respectively provided with control devices 18a to 18d configured with computers. The control devices 18a to 18d are connected to a server 22 via a network 20. The server 22 is provided with a database 24 which is a data storage device.

In a case where one processing process is finished, the processing targets 14a to 14d are moved from an accumulation location (first location) where the processing targets 14a to 14d are accumulated to a location (second location) where the next processing process by a transport device which will be described later. In the first location, the processing targets 14a to 14d are inspected, for example, by imaging the whole of the processing targets 14a to 14d with cameras.

Figure 2:
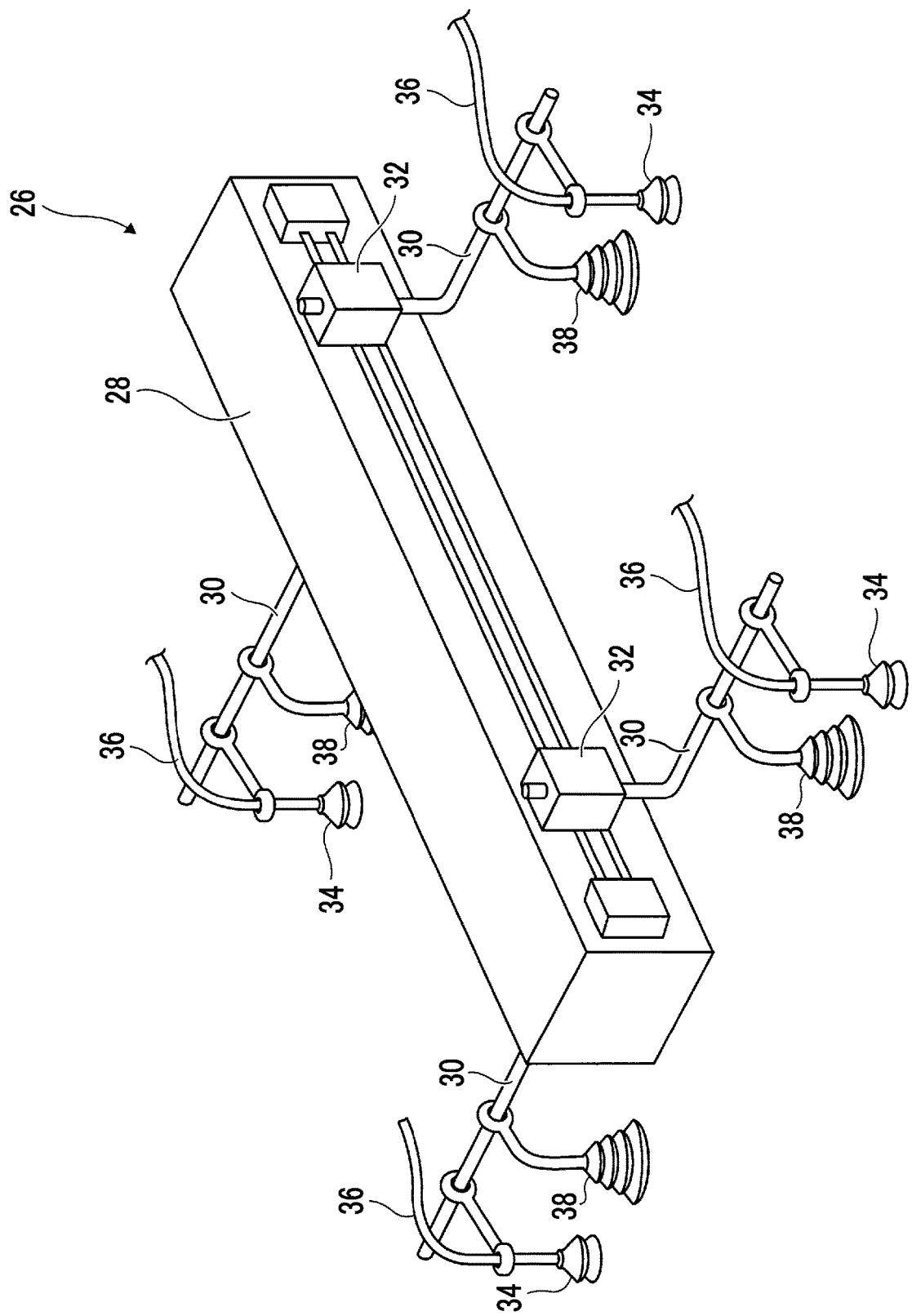
FIG. 2 is a perspective view illustrating a transport device used for a processing apparatus according to the exemplary embodiment of the present invention.

FIG. 2 illustrates a transport device 26 provided in each of the processing apparatuses 12a to 12d (collectively referred to as a processing apparatus 12). The transport device 26 configures a movement section moving each of the processing targets 14a to 14d (collectively referred to as a processing target 14), and has, for example, a transport device main body 28 formed in a rod shape. The transport device main body 28 is provided with, for example, four supports 30 on both sides of the transport device main body 28. Each of the supports 30 is connected to the transport device main body 28 via a rotation support portion 32. The transport device main body is driven in an upward-downward direction, a leftward-rightward direction, and a front-rear direction by a drive portion (not illustrated). The rotation support portion 32 rotationally drives the supports 30.

A holding portion 34 configuring a holding section is fixed to the support 30. The holding portion 34 is connected to a suction tube 36 so as to hold the processing target 14 through, for example, suction. The support 30 is provided with an imaging mechanism 38.

Figure 3:
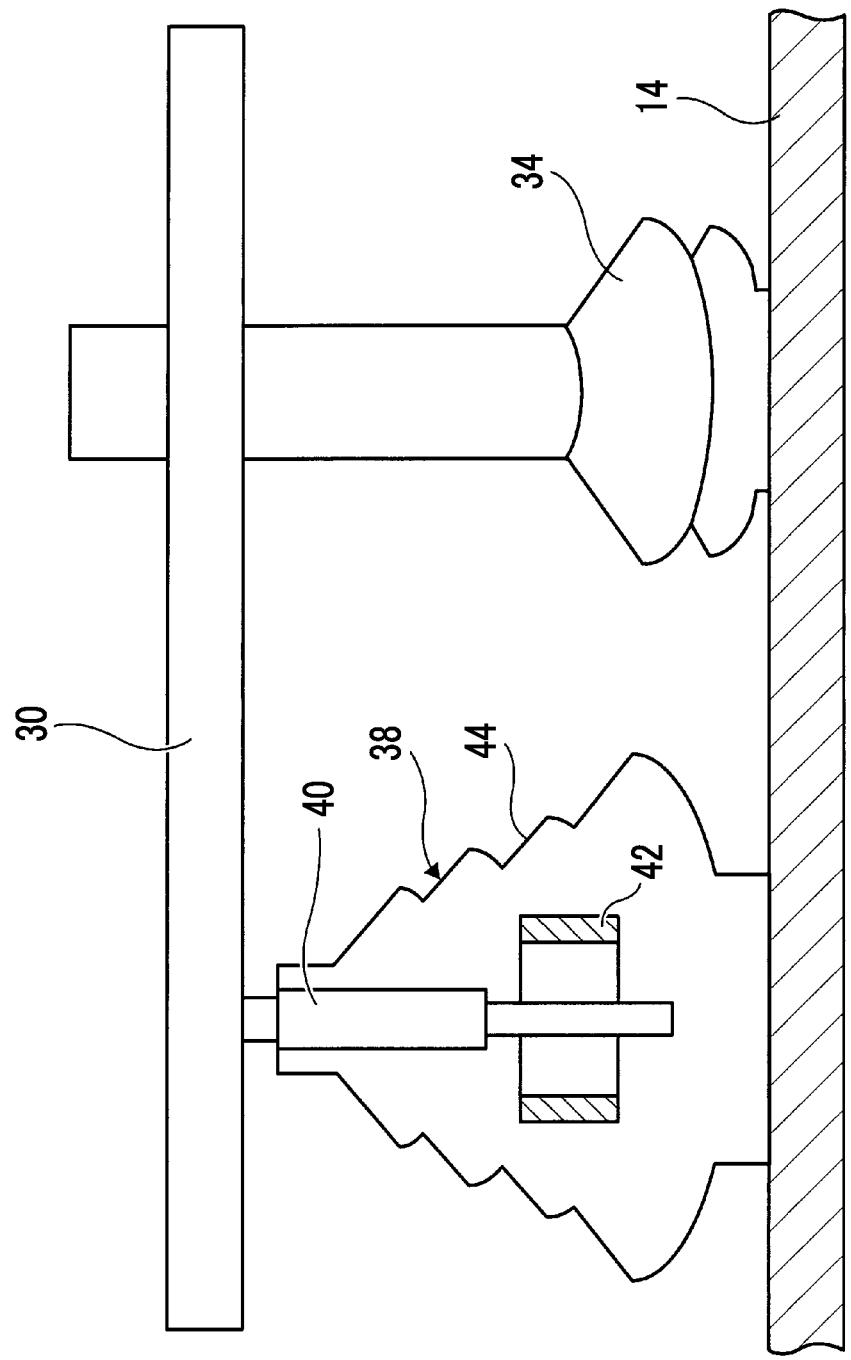
FIG. 3 is a sectional view illustrating a holding portion and an imaging mechanism in the transport device used for the processing apparatus according to the exemplary embodiment of the present invention.

As illustrated in FIG. 3, the imaging mechanism 38 includes a camera 40 configuring an imaging section, an illumination portion 42 provided around the camera 40, and a light blocking member 44 which covers the periphery of the camera 40 and the illumination portion 42. The camera 40 is fixed to the support 30. In the present exemplary embodiment, since the holding portion 34 and the camera 40 are fixed to the single support 30, the camera 40 is positionally fixed with respect to the holding portion 34 in a planar direction of the processing target 14.

The light blocking member 44 is formed of, for example, bellows, and is freely deformed such that a distance between the camera 40 and a surface of the processing target 14 is adjustable. The camera 40 is, for example, a high resolution camera which can perform imaging at, for example, 1200 dots per inch (dpi), and has a short focal length. In the present exemplary embodiment, the light blocking member 44 is deformed such that the camera 40 comes close to the surface of the processing target 14 due to the holding portion 34 sucking the processing target 14, and the camera 40 is focused.

Figure 4:
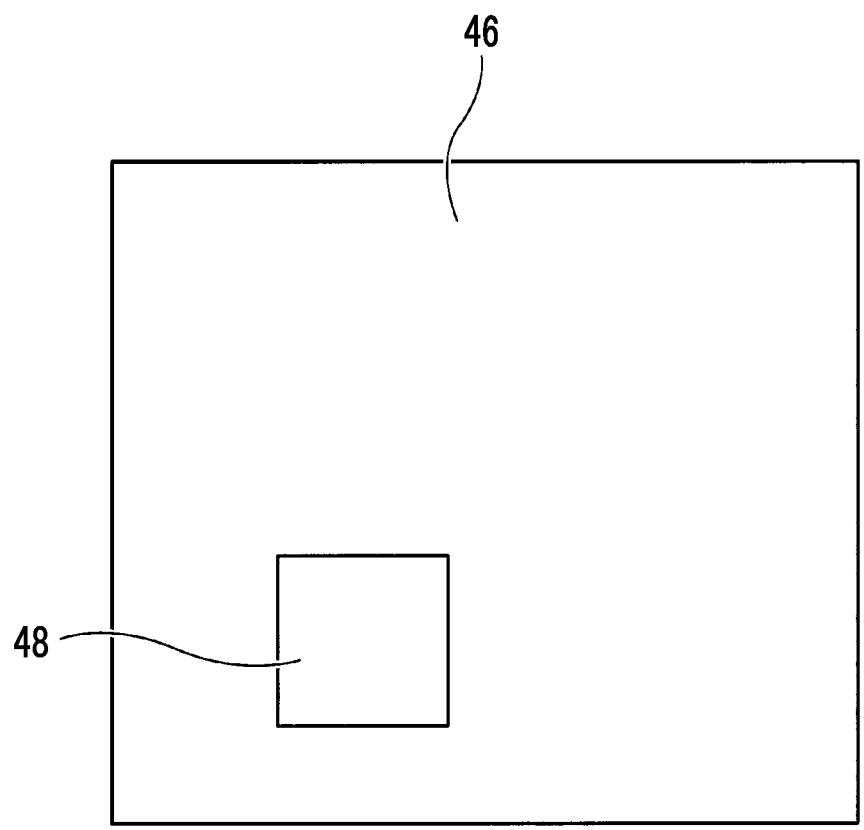
FIG. 4 is a plan view illustrating a position check image and a unique image of a surface of a processing target captured by a camera.

As illustrated in FIG. 4, the camera 40 obtains two images such as a position check image 46 which is captured at, for example, 200 dpi and a unique image 48 of the processing target captured at, for example, 1200 dpi. The position check image 46 is used to check a position of the camera 40, and the unique image 48 is sent to the server 22 so as to be recorded in the database 24 as will be described later.

In a case where the processing target 14 is, for example, a metal, a pattern specific to the metal is formed on the surface of the processing target 14. Therefore, in a case where the pattern specific to the metal is imaged by the camera 40, the captured image of the surface of the processing target 14 is unique to the processing target 14. In the respective processing apparatuses 12a to 12d, shapes of the processing targets 14a to 14d are different from each other, and thus the holding portion 34 is moved to a position appropriate for suction, for example, a flat position. In the respective processing apparatuses 12a to 12d, positions of the holding portions 34 are different from each other, and thus positions of the cameras 40 are also different from each other. Thus, a position of the camera 40 is specified for each of the processing apparatuses 12a to 12d, and an image of a surface of each of the processing targets 14a to 14d captured by the camera 40 is stored to be associated with the single processing target 14 into the database 24.

Figure 5:
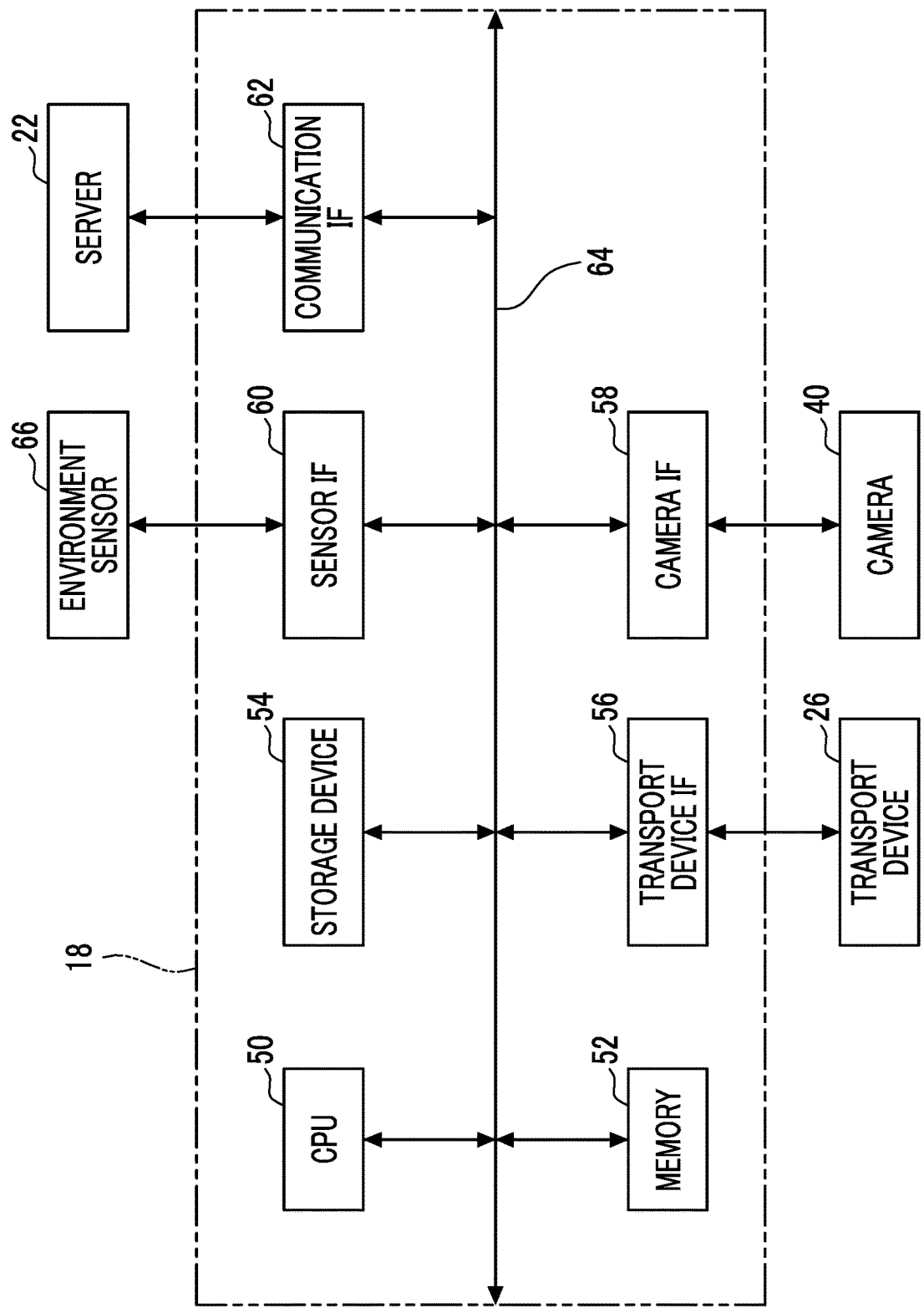
FIG. 5 is a block diagram illustrating a control device used for the processing apparatus according to the exemplary embodiment of the present invention.

FIG. 5 is a block diagram illustrating each of the control devices 18a to 18d (collectively referred to as a control device 18).

The control device 18 includes a CPU 50, a memory 52, a storage device 54, a transport device interface 56, a camera interface 58, a sensor interface 60, and a communication interface 62, and the above-described elements are connected to each other via a control bus 64.

The CPU 50 performs a preset process based on a control program stored in the memory 52. The storage device 54 is a nonvolatile memory such as a hard disk or a solid state drive (SSD) which is a kind of semiconductor memory. The transport device interface 56 is connected to the transport device 26. The transport device 26 is controlled via the transport device interface 56. The camera interface 58 is connected to the camera 40. A shutter, a resolution, and the like of the camera 40 are controlled via the camera interface 58.

The sensor interface 60 is connected to an environment sensor 66. The environment sensor 66 detects an environment during imaging of the camera 40, for example, a temperature or a humidity. Various pieces of data are transmitted to the server 22 via the communication interface 62.

FIG. 6 is a flowchart illustrating a control flow in the control device 18.

First, in step S10, the control device 18 receives setting of processing conditions. The processing conditions are conditions in pressing, and include press pressure, a tact time (the time required for pressing performed once), setting of the processing apparatus, and the like.

In the subsequent step S12, environment data such as a temperature and a humidity is received from the environment sensor 66. In the subsequent step S14, the transport device 26 is moved to the first location where the processing target 14 is placed. Here, the processing target has different shapes in the respective processes, and thus the transport device 26 is controlled such that the holding portion 34 is disposed at preset positions in the respective processes. It is preferable that the holding portion 34 is controlled to be disposed on a planar portion of the processing target 14. It is preferable that the camera 40 is also controlled such that the holding portion 34 is disposed on the planar portion of the processing target 14.

In the subsequent step S16, the holding portion 34 starts to suck the processing target 14. In the subsequent step S18, it is determined whether or not suction is completed, and the control device 18 waits for the suction to be completed. In step S18, in a case where it is determined that the suction is completed, and the camera 40 is stopped relatively with respect to the processing target 14, the flow proceeds to the subsequent step S20. In step S20, it is determined whether or not the camera 40 is focused on a surface of the processing target 14. In step S18, in a case where it is determined that the camera 40 is not stopped relatively with respect to the processing target 14, and, in step S20, it is determined that the camera 40 is not focused on the surface of the processing target 14, the flow does not proceed to step S22, and the camera 40 is not allowed to capture an image of the surface of the processing target 14.

In step S22, the camera 40 captures an image of the surface of the processing target 14. As described above, captured images include the position check image 46 and the unique image 48.

Herein, an image of the surface of the processing target 14 is captured in the first location, but the camera 40 may be moved to the second location, and may be stopped to capture an image of the surface of the processing target 14. Particularly, in a case where an image of the surface of the processing target 14 captured in the first location is, for example, defocused or insufficient in luminance, an image of the surface of the processing target 14 may be captured again in the second location.

In a case where the process in step S22 is finished, the flow proceeds to the subsequent step S24, and various pieces of data are transmitted to the server 22. The transmitted data includes the processing condition data set in step S10, the environment data received in step S12, and the image data of the surface of the processing target 14 captured in step S22.

In a case where the pieces of data are transmitted to the server 22 in step S24, the server 22 registers the various pieces of data to be associated with corresponding information into the database 24.

In other words, as illustrated in FIG. 7, a number is added to the transmitted image data of the surface of the processing target 14 so as to be managed as a captured image management number, and the imaging date and time, a lot number (material management number) of a material of the processing target 14, a management number of the processing target, an environment during imaging, processing conditions, and a lot number of a finished product are registered to be associated with the captured image management number. The environment during imaging includes a temperature, a humidity, processes (numbers or symbols respectively corresponding to processes such as molding, shearing, bending, and drilling), an imaging position, and the like. The processing conditions include a press pressure value, a tact time, setting of the processing apparatus, and the like. The lot number of a finished product is added to a finished product.

Referring to FIG. 6, in a case where the process in step S24 is finished, the flow proceeds to the subsequent step S26, and the processing target 14 is moved to the processing apparatus 12 corresponding to the second location. In the subsequent step S28, the holding portion 34 cancels holding of the processing target 14, and in the subsequent step S30, the processing apparatus 12 processes the processing target 14.

In the subsequent step S32, it is determined whether or not the next processing target 14 is present in the first location. In a case where it is determined that the next processing target 14 is present in step S32, the flow returns to step S14, and the transport device 26 is moved to the first location in order to transport the next processing target 14. In a case where it is determined that there is no next processing target 14 in step S32, the process is finished. The processing target 14 having undergone one process is transported to undergo the next process by a belt conveyer or the like.

Figure 8:
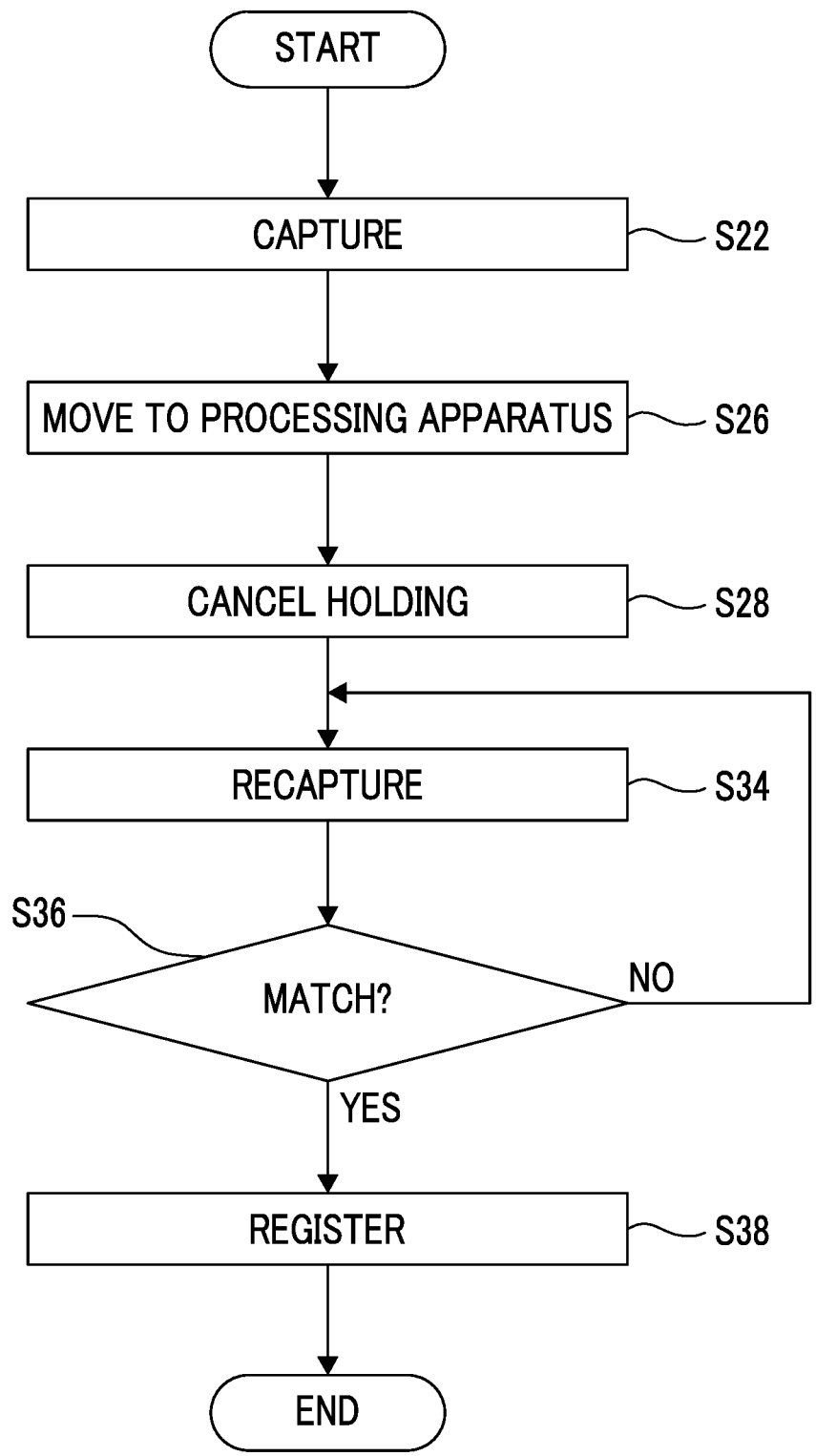
FIG. 8 is a flowchart illustrating a modification example of the control flow in the control device used for the processing apparatus according to the exemplary embodiment of the present invention.

FIG. 8 is a flowchart illustrating a modification example of the control flow in the control device 18.

As shown in step S14, step S22, step S26, and step S28, the control flow of the modification example is the same as the above-described control flow in that the surface of the processing target 14 is imaged by the camera 40 in the first location, movement to the second location (a location of the processing apparatus) occurs, and the holding portion 34 cancels holding of the processing target 14, but, in the modification example, in step S34, the holding portion 34 cancels holding of the processing target 14, and then the camera 40 images an identical portion of the processing target 14 again.

In the subsequent step S36, it is determined whether or not an image of the surface of the processing target 14 captured in step S22 matches an image of the surface of the processing target 14 recaptured in step S34. In a case where both images match each other in step S36, in step S38, a surface image (either the surface image captured in step S22 or the surface image recaptured in step S34) is transmitted to and registered into the server 22. On the other hand, it is determined that the two surface images do not match each other in step S36, the flow returns to step S34, and reimaging is performed. The reimaging in step S34 is executed until it is determined that both surface images match each other in step S36.

As mentioned above, the reason why reimaging of the surface of the processing target 14 is performed is that, in a case where the processing target 14 is imaged for the future collation, this is performed in a state in which holding in the holding portion 34 is canceled, and thus it is also checked whether or not images of the surface of the processing target 14 match each other in this case.

Figure 9:
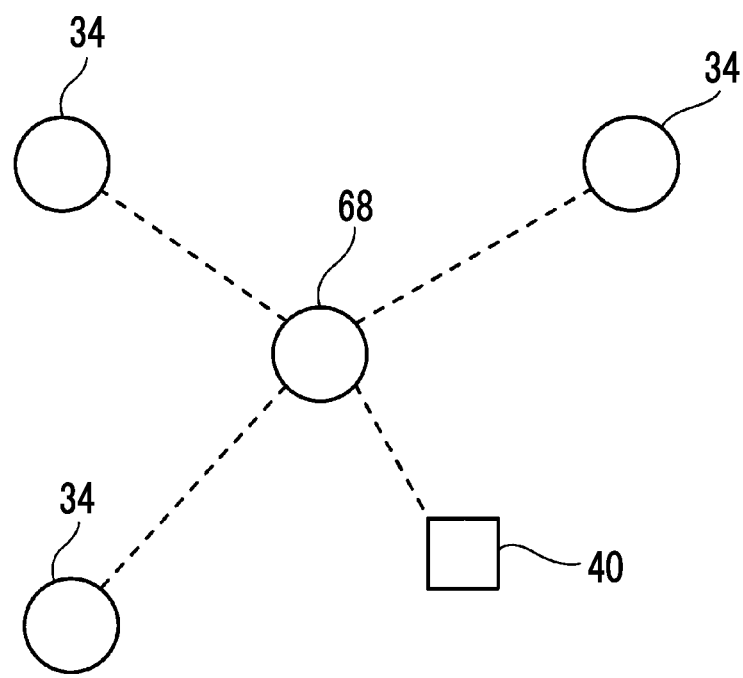
FIG. 9 is a schematic diagram illustrating a positional relationship between the holding portion and the camera in the processing apparatus according to the exemplary embodiment of the present invention.

In the exemplary embodiment, the camera 40 is provided at the identical support 30, and a position thereof is fixed with respect to the holding portion 34, but the present invention is not limited thereto. Even though the camera 40 and the holding portion 34 are fixed to different members, relative positions may be fixed. A position of the holding portion 34 is fundamentally known, but, for example, as illustrated in FIG. 9, even in a case where a position of the holding portion 34 is moved, a position detection sensor (or a camera) 68 may be provided, the position detection sensor 68 may obtain a position of the camera 40 through computation based on positions of three holding portions 34. In the exemplary embodiment, the holding portion 34 is configured with a suction device, but the present invention is not limited thereto, and, for example, a chuck may mechanically hold a processing target.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
   a holding section that holds a processing target;
   an imaging section that is positionally fixed with respect to the holding section, and images a surface of the processing target;
   a movement section that moves the processing target in a state in which the holding section holds the processing target, wherein the movement section has a support on which the holding section and the imaging section are fixed; and
   a control section that controls the imaging section to image the surface of the processing target in a state in which the holding section holds the processing target,
   wherein the control section controls the imaging section not to image the surface of the processing target in a case where the holding section is moved by the movement section.

2. The processing apparatus according to claim 1,
   wherein the control section controls the imaging section to image the surface of the processing target in a case where the imaging section is relatively stopped with respect to the processing target.

3. The processing apparatus according to claim 1,
   wherein the control section controls the imaging section not to image the surface of the processing target in a case where the imaging section is relatively moved with respect to the processing target.

4. The processing apparatus according to claim 1,
   wherein the control section controls the imaging section to image the surface of the processing target in a case where the holding section is not moved by the movement section.

5. The processing apparatus according to claim 1,
   wherein the control section controls the imaging section to image the surface of the processing target in a case where the imaging section is focused on the surface of the processing target.

6. The processing apparatus according to claim 1,
   wherein the control section controls the imaging section not to image the surface of the processing target in a case where the imaging section is not focused on the surface of the processing target.

7. The processing apparatus according to claim 1,
   wherein, in a case where an image of the surface of the processing target captured in a first location by the imaging section does not satisfy a preset reference, the control section controls the imaging section to image the surface of the processing target again when movement to a second location occurs.

8. The processing apparatus according to claim 1,
   wherein,
   a first image of the surface of the processing target captured by the imaging section is provided in a state in which the holding section holds the processing target, and
   a second image of the surface of the processing target captured by the imaging section is provided in a state in which the holding section does not hold the processing target,
   in a case where the first image matches the second image, the control section performs control such that the first image is registered.

9. The processing apparatus according to claim 8,
   wherein, in a case where the first image and the second image do not match each other, the control section causes the imaging section to image the surface of the processing target again in a state in which the holding section does not hold the processing target.

10. The processing apparatus according to claim 9,
    wherein the control section performs control such that imaging is continuously performed until the first image and the second image match each other.

11. The processing apparatus according to claim 1, further comprising:
    a light blocking member that covers a periphery of the imaging section.

12. The processing apparatus according to claim 11,
    wherein the light blocking member is freely deformed in an imaging direction such that a distance between the imaging section and the processing target is adjustable in a state in which the light blocking member covers the periphery of the imaging section.

13. The processing apparatus according to claim 1, further comprising:
    a position detection section that detects a position of the imaging section with respect to the holding section.

14. The processing apparatus according to claim 1,
    wherein the holding section, the imaging section, and the control section are used in each of a plurality of processing processes.

15. A processing system comprising:
    a processing apparatus that processes a processing target; and
    a data storage device that stores data sent from the processing apparatus,
    wherein the processing apparatus includes
      a holding section that holds a processing target;
      an imaging section that is positionally fixed with respect to the holding section, and images a surface of the processing target;
      a movement section that moves the processing target in a state in which the holding section holds the processing target, wherein the movement section has a support on which the holding section and the imaging section are fixed; and a control section that controls the imaging section to image the surface of the processing target in a state in which the holding section holds the processing target, and wherein the data storage device stores data regarding a position of the imaging section in association with a surface image of the processing target captured by the imaging section, wherein the control section controls the imaging section not to image the surface of the processing target in a case where the holding section is moved by the movement section.

16. The processing system according to claim 15,
wherein the data storage device further stores processing condition data based on which the processing target is processed by the processing apparatus in association.

17. The processing system according to claim 15,
wherein the data storage device further stores environment data of when the processing apparatus processes the processing target.

18. A non-transitory computer readable medium storing a program causing a computer to execute:

causing a holding section to hold a processing target;

causing an imaging section positionally fixed with respect to the holding section to image a surface of the processing target;

causing a movement section to move the processing target in a state in which the holding section holds the processing target, wherein the movement section has a support on which the holding section and the imaging section are fixed; and controlling the imaging section to image the surface of the processing target in a state in which the holding section holds the processing target, and wherein the imaging section is controlled not to image the surface of the processing target in a case where the holding section is moved by the movement section.

* * * * *